Sept. 8, 1925.
W. WATTS
1,553,277
CHECK CUTTING AND ASSEMBLING MACHINE
Filed March 26, 1924     3 Sheets-Sheet 1
Fig-1-
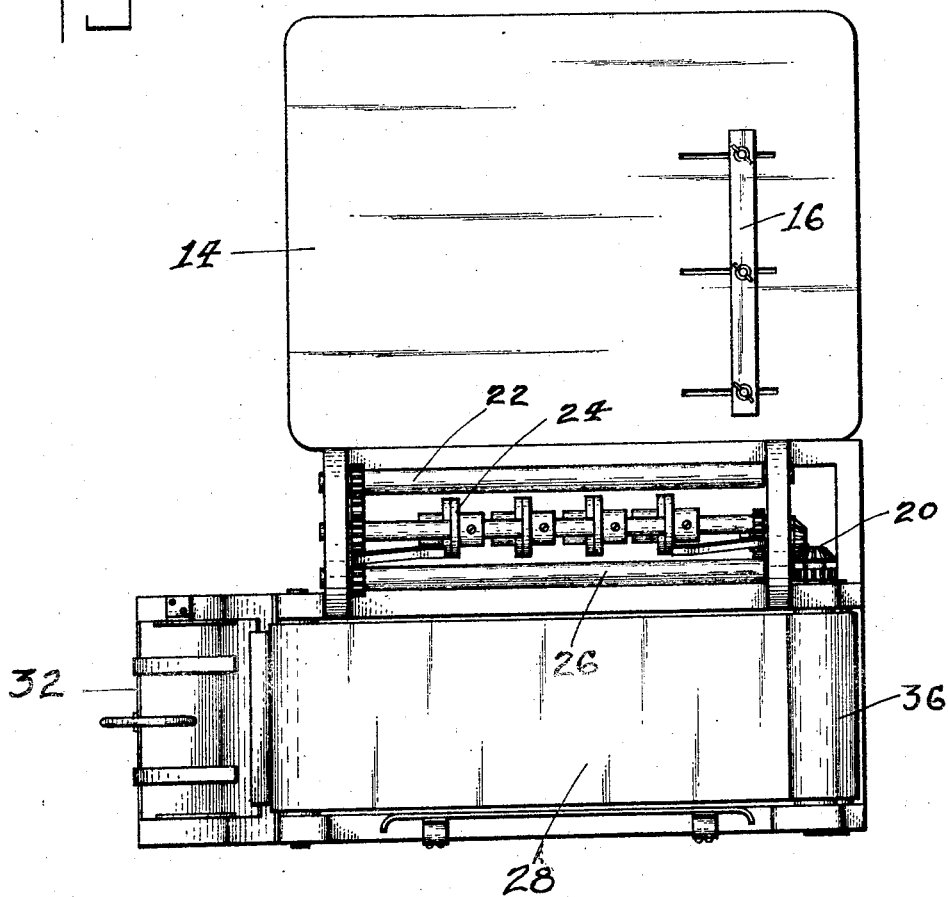
William Watts
INVENTOR.
BY Albert J. Fike
ATTORNEY.

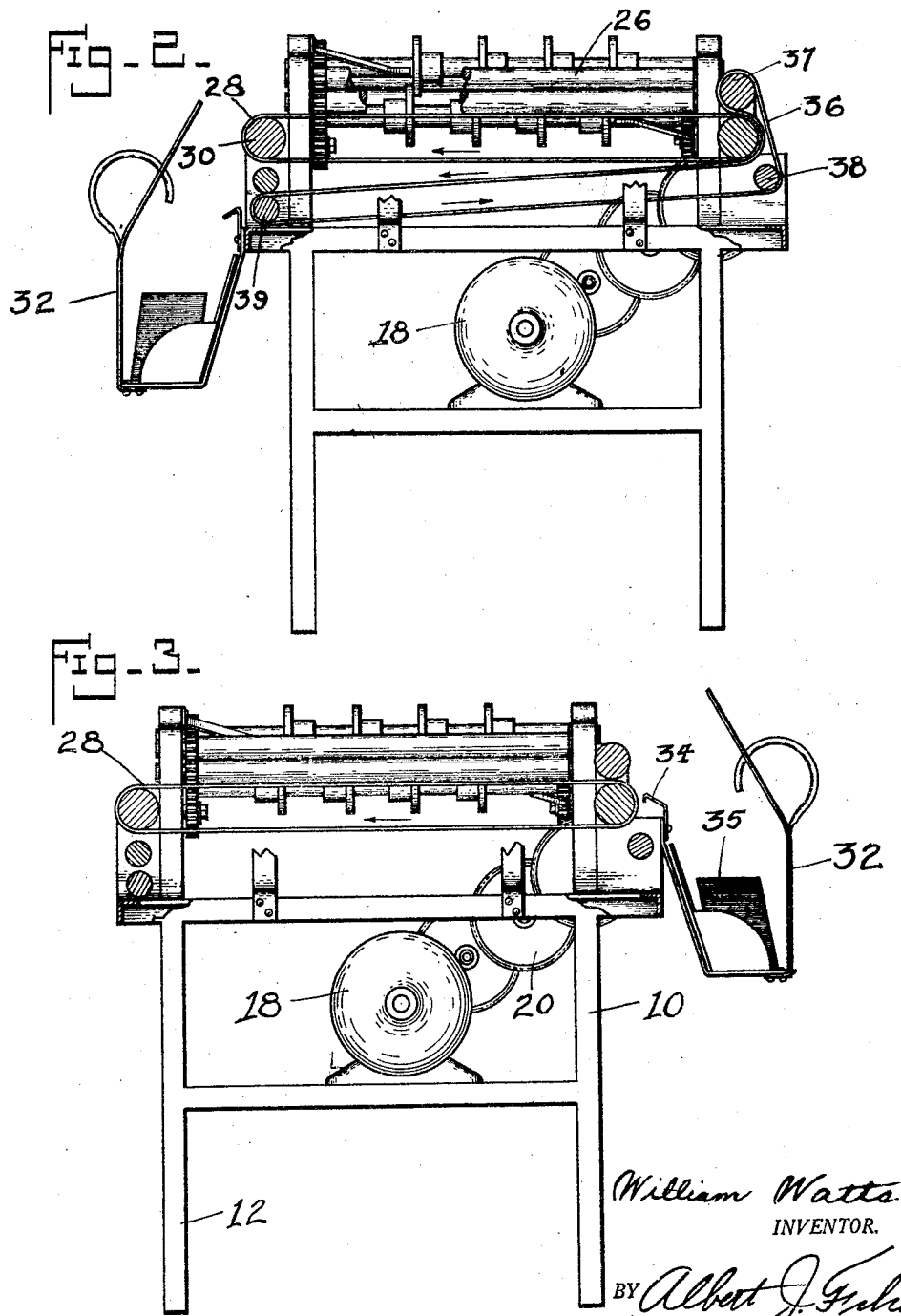

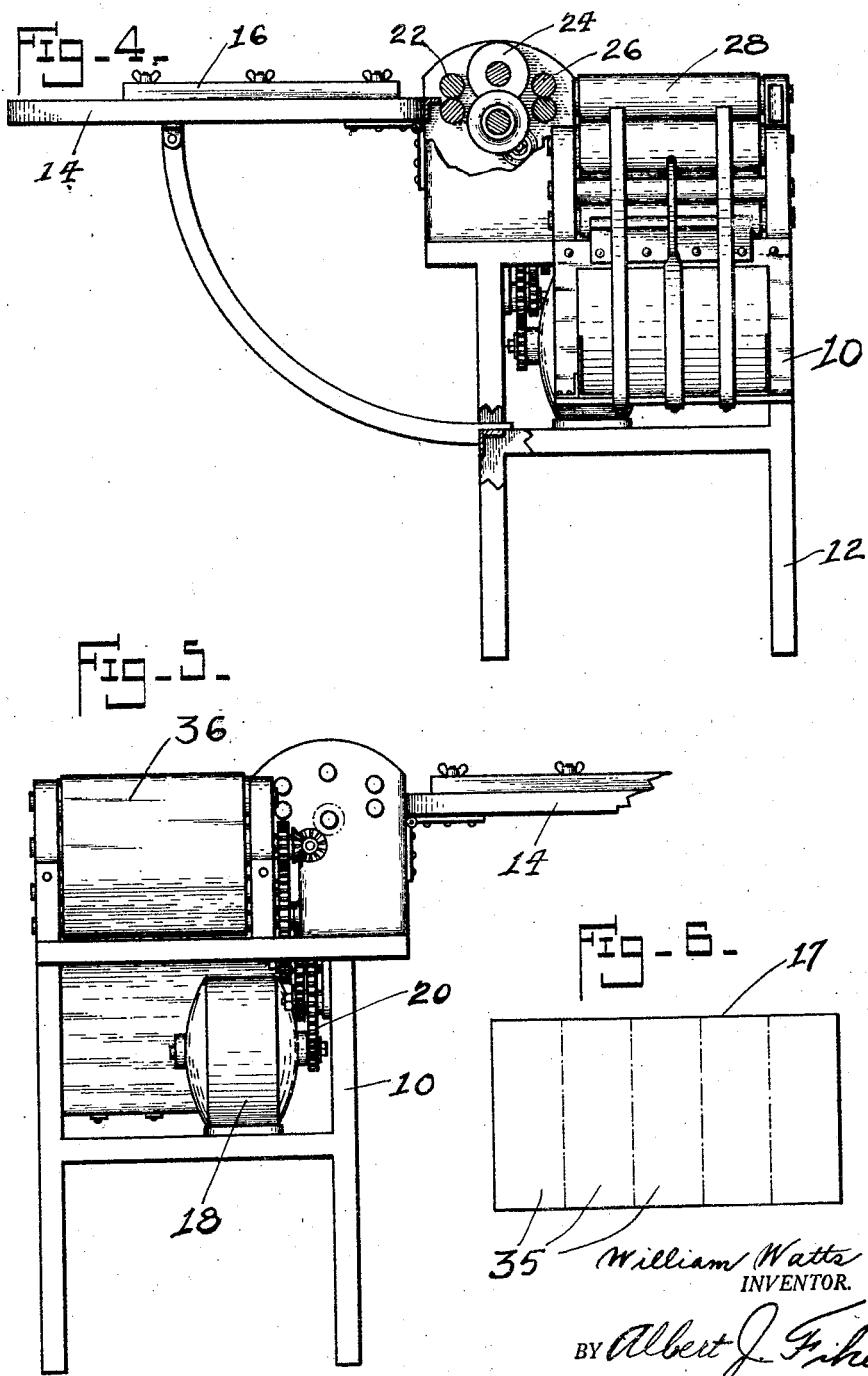

Patented Sept. 8, 1925.

1,553,277

UNITED STATES PATENT OFFICE.

WILLIAM WATTS, OF LOUISVILLE, KENTUCKY.

CHECK CUTTING AND ASSEMBLING MACHINE.

Application filed March 26, 1924. Serial No. 702,058.

*To all whom it may concern:*

Be it known that I, WILLIAM WATTS, a citizen of the United States, residing at Louisville, in the county of Jefferson and State of Kentucky, have invented certain new and useful Improvements in Check Cutting and Assembling Machines; and I do hereby declare the following to be a full, clear, and exact description of the invention, such as will enable others skilled in the art to which it appertains to make and use the same.

This invention relates to improved check cutting and assembling machines and has for one of its principal objects the provision of such a machine whereby checks, such as dividend checks or the like which are usually made up in sheets of five or more and signed on a multiple signature machine, may be readily and conveniently separated and at the same time numerically arranged.

One of the important objects of this invention is the provision of a check cutting and assembling machine which will eliminate the necessity of perforated sheets of checks by providing mechanism whereby large sheets, each comprising a number of checks, are fed into the machine, properly cut into desired units, and later automatically stacked in numerical order.

Another and further important object of the invention is the provision of an attachment for a check cutting and assembling machine whereby unitary checks or other slips of paper may be conveniently cut from a single large sheet into strips of uniform width and later properly consecutively assembled either face up or face down, as desired.

Other and further important objects of this invention will be apparent from the disclosures in the accompanying drawings and following specification.

The invention, in a preferred form, is illustrated in the drawings and hereinafter more fully described.

In the drawings:

Figure 1 is a top plan view of the improved check cutting and assembling machine of this invention.

Figure 2 is a front view of the machine, parts being broken away, illustrating the arrangement of the conveyor belt and rollers adapted for delivering checks stacked face down.

Figure 3 is another front view of the machine, parts being broken away, illustrating the arrangement of the rollers, conveyor belts, and hopper when checks are to be delivered stacked face up.

Figure 4 is a detail view of the hopper end of the machine with the parts in the position illustrated in Figure 2, portions being broken away to show the feed rollers and cutter rollers.

Figure 5 is an end elevation of the machine illustrating the end opposite to that shown in Figure 4.

Figure 6 is an outline of the original sheet comprising a plurality of checks showing the lines of cut in dot and dash lines.

As shown in the drawings:

The reference numeral 10 illustrates generally the framework of the improved machine of this invention having supporting legs 12 and provided with a disappearing feed table 14 as illustrated. An adjustable guide 16 is provided on the feed table 14 whereby the relation of the original sheets 17 to the cutting rollers is accurately predetermined.

A motor or other suitable power element 18 is mounted in the frame 10 and through a system of gears 20 is adapted to drive the feed rollers 22 and the cutting rollers 24 together with the delivery elements of the machine.

A pair of delivery rollers 26 is preferably positioned adjacent the cutting rollers 24 and these delivery rollers are adapted to pass the separated checks onto a traveling belt 28 suitably mounted upon driving rollers 30. The direction of travel of this belt 28 is indicated by the arrows in Figures 2 and 3 and, as illustrated in Figure 3, checks delivered onto this belt will be carried thereby to the hopper 32, which is removably attached to the machine frame 10 and will be deposited in this hopper in numerical order with the faces up, provided that the original sheets have been fed into the machine in this position. A guide 34 co-operates with the hopper 32 in order to insure the proper delivery of the checks 35 into the hopper.

As best illustrated in Figure 2, an auxiliary belt 36, traveling upon rollers 37, 38, and 39, may be brought into co-operative relation with the belt 28, whereby checks delivered onto the upper face of the belt 28 will be carried between this belt and the belt 36 at a point adjacent the roller 37 and then will be carried downwardly and across to the other side of the machine as illustrated by the arrow in Figure 2, whence they will be delivered into the hopper 32, which in this case has been removed to the other side of the machine for the reception of checks. It will be evident that the checks will have been turned face downward during the process of transfer from the belt 28 to the belt 36 and will be delivered into the hopper in this position, but in the same numerical order as they were when originally fed into the machine.

It will be evident that herein is provided a check cutting and assembling machine which will be particularly adapted to be used by large corporations accustomed to getting out a considerable number of checks at stated intervals. Heretofore it has been the practice to have the sheets of checks perforated along certain lines at the time of printing and after the checks have been signed on a multiple signature machine they are torn apart by hand, entailing a good deal of hard work and necessary delay.

The machine of this invention eliminates the necessity of perforating the original sheets and renders the entire operation a great deal speedier, easier, and consequently more economical, both as regards labor and expense.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a check cutting and assembling machine the combination of a feed table, a pair of feed rollers, a series of rotatable cutting elements, a pair of delivery rollers, a delivery belt traveling in a direction at right angles to the direction of travel of the rollers and cutters, and driving means for the rollers, cutters, and delivery belt comprising a motor and a series of connected driving gears.

2. In a check cutting and assembling machine the combination of a feed table, a pair of feed rollers, a series of rotatable cutting elements, a pair of delivery rollers, and delivery means comprising a plurality of belts traveling in a direction at right angles to the direction of travel of the rollers and cutters, together with hopper means for receiving the separated checks in consecutive numerical order.

3. In a check cutting and assembling machine the combination of a feed table, a pair of feed rollers, a series of rotatable cutting elements, a pair of delivery rollers, a pair of co-operative delivery belts traveling in a direction at right angles to the direction of travel of the rollers and cutters, one of said belts adapted to have its check carrying portion move in a direction opposite to the check carrying motion of the original check receiving belt and contacting with the original belt at a portion of its length.

In testimony whereof I affix my signature.

WILLIAM WATTS.